United States Patent [19]

Martin et al.

[11] Patent Number: 5,753,150
[45] Date of Patent: May 19, 1998

[54] LOW OXYGEN MOLDING OF SOFT CONTACT LENSES

[75] Inventors: Wallace Anthony Martin, Orange Park; Jonathan Patrick Adams; John Benjamin Enns, both of Jacksonville, all of Fla.; Ture Kindt-Larsen, Holte, Denmark

[73] Assignee: Johnson & Johnson Vision Products, Inc., Jacksonville, Fla.

[21] Appl. No.: 812,817

[22] Filed: Mar. 6, 1997

Related U.S. Application Data

[63] Continuation of Ser. No. 257,802, Jun. 10, 1994, abandoned.

[51] Int. Cl.[6] .................................................. B29D 11/00
[52] U.S. Cl. .............................. 264/2.5; 264/1.1; 264/85
[58] Field of Search .......................... 264/2.5, 1.1, 85; 425/73–75, 808

[56] References Cited

U.S. PATENT DOCUMENTS

| | | |
|---|---|---|
| 2,911,678 | 11/1959 | Brunfeldt . |
| 3,423,488 | 1/1969 | Bowser ................................... 264/85 |
| 3,496,254 | 2/1970 | Wichterle ............................... 264/85 |
| 3,660,545 | 5/1972 | Wichterle ............................... 264/2.5 |
| 4,054,624 | 10/1977 | Le Bouef et al. . |
| 4,284,591 | 8/1981 | Neefe . |
| 4,495,313 | 1/1985 | Larsen . |
| 4,565,348 | 1/1986 | Larsen . |
| 4,640,489 | 2/1987 | Larsen . |
| 4,680,336 | 7/1987 | Larsen et al. . |
| 4,691,820 | 9/1987 | Martinez . |
| 4,786,444 | 11/1988 | Hwang ..................................... 264/85 |
| 4,889,664 | 12/1989 | Kindt-Larsen et al. . |
| 4,988,277 | 1/1991 | Wichterle et al. ......................... 425/73 |
| 5,039,459 | 8/1991 | Kindt-Larsen et al. . |
| 5,080,839 | 1/1992 | Kindt-Larsen . |
| 5,094,609 | 3/1992 | Kindt-Larsen . |
| 5,200,121 | 4/1993 | Hagmann et al. ........................ 264/2.5 |
| 5,230,840 | 7/1993 | Nishiguchi et al. ...................... 264/85 |
| 5,271,875 | 12/1993 | Appleton et al. ........................ 264/2.6 |
| 5,435,943 | 7/1995 | Adams et al. ............................ 264/85 |

FOREIGN PATENT DOCUMENTS

| | | | |
|---|---|---|---|
| 61-172711 | 8/1986 | Japan | ........................ 264/85 |

OTHER PUBLICATIONS

"Acrylic and Methacrylic Ester Polymers", Encyclopedia of Polymer Science and Engineering, 2nd Edition, vol. 1, pp. 265–269.

Primary Examiner—Mathieu D. Vargot

[57] ABSTRACT

A process for providing degassed complementary concave and convex lens molds to filling and mold assembly stations in a continuous or semicontinuous automated soft contact lens manufacturing system. The process includes injection molding the lens molds, immediately transferring the lens molds to an inert gas atmosphere, degassing the lens molds, and filling the lens molds with a polymerizable monomer under the inert gas prior to mold assembly.

11 Claims, 7 Drawing Sheets

LOW OXYGEN MOLDING OF SOFT CONTACT LENSES

This is a continuation of application Ser. No. 08/257,802, filed Jun. 10, 1994, now abandoned.

BACKGROUND OF THE INVENTION

1. Field of the Invention

The present invention relates generally to a method for molding soft contact lenses, and particularly a low oxygen method for molding and handling lens molds to minimize defects in lens blanks produced therewith.

2. Discussion of the Prior Art

Contact lens blanks may be made in two-part molds of the type described and shown in U.S. Pat. Nos. 4,565,348 and 4,640,489 by polymerizing a reactive monomer and a water displaceable diluent optionally in the presence of a catalyst, under conditions of elevated temperature or actinic radiation, generally ultraviolet light, as described in U.S. Pat. No. 4,495,313.

Typically, molds are formed, generally by injection molding, from a suitable thermoplastic, and the molds, usually in frames associating a number of such molds with support structure are shipped to and stored for use in a production facility for contact lens blanks. The lens blank production line then comprises stations for filling the concave lens molds with the polymerizable lens-forming composition, registering therewith in vertical displacement convex lens molds, urging the respective paired molds into molding engagement about the periphery of the polymerizable monomer pool, thereby displacing excess monomer and forming an incipient lens blank, curing the reactive monomer to form the lens blank, and demolding the lens blank all as described in the aforementioned U.S. patents or U.S. Pat. Nos. 4,680,336 or 5,080,839 all of which are incorporated herein by reference.

It is known that the use of lens molds maintained under normal atmospheric conditions leads to inhibition of, and thus incomplete curing of the reactive monomer composition at the surface of the lens, which in turn can adversely alter physical properties and optical parameters of the lens. This phenomenon has been traced to the presence of oxygen molecules in and on the lens mold surface, which is due to its inherent capability of the preferred polystyrene molding material to sorb quantities of oxygen. During molding of the lens, this oxygen can be released to the polymerization interface with the reactive monomer composition in amounts which exceed acceptable maximums as determined by empirical testing. More specifically, the oxygen copolymerizes rapidly with the reactive monomer but the polymerization chain thus formed is readily terminated, the result being a decrease in rate of monomer reaction, the kinetic chain length, and the polymer molecular weight. The criticality of oxygen level and the difficulty of implementing effective control protocols may be appreciated by recognizing that the level of oxygen at the reactive monomer/mold interface must be controlled to approximately 300 times less than the concentration of oxygen in air ($3\times10^{-3}$ moles/liter).

This recognized problem has been addressed in the art by careful but time consuming and laborious preconditioning of the molds utilizing chambers evacuated to a maximum of 1 torr and maintained in this condition for a period of not less than 10–12 hours. Any interruption of the work cycle such as might be caused by a power interruption requires reinitiation of the conditioning treatment. Extended thermal treatment is contraindicated with these preformed molds and mold frames to avoid warping, surface bubbling and the like which even in microscopic terms would destroy the integrity of the surface for its purpose in defining a lens of the requisite optical clarity. Thus, while limited heating, e.g. 1 hour at 75° C., may be employed there remained a need for a less cumbersome and more reliable method to control oxygen levels at the mold surface without distortion thereof.

However, even brief exposure of the molds to air after degassing, as in normal manufacturing handling is detrimental; it has been learned that even a 30 second exposure to air results in sufficient absorption of oxygen to require 5 to 10 minutes degassing to reacquire an acceptable condition. Accordingly, a degassing operation immediately proximate the manufacturing line, particularly for large volume transfers of molds with different exposure times was deemed impractical, and no real improvement over the present system.

The problem is complicated by the fact that the front and back curves of the juxtaposed mold sections exhibit different thicknesses, leading to potentially different exposure of the reactive monomer composition to oxygen across the surfaces of varying cross-sections which could result in distortion of the lens and degradation of its optical properties, including refractive index. Thus, the concentration distribution of oxygen in the respective mold sections or halves remains symmetrical for short degas times, but becomes progressively less symmetrical for longer degas times, and the anomaly can cause uneven cure and different properties between the front and rear surface. For example, the convex mold may be degassed within about 2 hours, whereas the concave mold may not be entirely degassed even after 10 hours.

The commercial demand for soft contact lenses has dictated the development of continuous or at least semicontinuous manufacturing lines. The criticality of manufacturing specifications in turn demands automated handling of the lens manufacturing operation.

It is thus an object of the present invention to provide a method for the control of oxygen in a contact lens manufacturing system permitting the production of contact lens blanks with substantially reduced defect levels.

It is also an object to produce such contact lens blanks consistently with continuous or at least semicontinuous manufacturing lines to achieve high speed, high volume operations.

It is a further object to integrate such manufacture with automated systems to minimize handling and improve and shorten time delays in material transfer.

Each of these objectives has now been met in relation to the critical stages of producing and handling lens blanks from molding through curing steps, in an integrated and automated contact lens manufacturing system capable of continuous operation at high speed.

SUMMARY OF THE INVENTION

The invention involves the improved manufacture of lens blanks for soft contact lenses and more particularly to subsystem operations, procedures and protocols implemented in a continuous or at least semi-continuous automated manufacturing line to provide at high speed, lenses of improved physical and especially optical characteristics, including reduced variability, for example as measured by standard deviation in base curve radii. The invention includes a method implemented by associated apparatus according to a protocol to control oxygen levels at the interface between the lens mold blank and the reactive monomer composition within levels for reliable production of lenses of acceptable optical quality under optimum manufacturing conditions.

Specifically, it has now been discovered that satisfactory control of oxygenation of the lens mold surfaces may be achieved upon the basis of considerations of diffusivity rates for oxygen molecules in or on the mold itself and interchange with the surrounding medium.

In accordance with the present invention, lens mold blank preparation is integrated with lens blank manufacture to minimize time of exposure of lens blank molds to oxygen prior to implementation of the curing stage. Given that even a one minute delay between filling (introduction of the reactive monomer composition to the cavity of the concave lens mold section) and curing would require five hours of degas to achieve a target minimum of $1 \times 10^{-8}$ moles/cm$^3$ concentration of oxygen at the reactive monomer/mold interface, the facility of in line preparation of the lens mold blanks will be appreciated. Reduction in oxygen levels is thus achieved not by degas alone, as practiced in the prior method, but in the high temperature conditions obtained in the molding equipment, and the fresh molding of a fully degassed old blank which is as soon as possible blanketed in an inert gas such as nitrogen for further handling through filling, precure and final cure.

It has been determined that a key parameter in controlling oxygen levels at the mold interface is the diffusivity of oxygen into and from the mold surface in response to ambient conditions, and thereafter to and into the mold/reactive monomer composition. Molded lens molds readily accept via adsorption and absorption mechanisms an unacceptably high level of retained but migratable oxygen relative to the sensitivity of the reactive monomer composition, particularly in the case of the preferred polystyrene mold component. The migration of oxygen responds to concentration such that when a mold is subjected to a vacuum, it will migrate at applicable diffusion rates to the lesser concentration, in this instance the vacuum. Naturally, the surface of the mold will be the last portion to fully degas, leading to the unacceptably long degas times for conditioning pretreatment. For similar reasons, readsorption of oxygen will occur at the surface, and reequilibration to the interior will again be controlled by diffusion rates in the mold material, hence any exposure to the atmosphere will rapidly result in unacceptably high levels of oxygen at the mold interface, which only relatively extensive conditioning treatment will resolve, as a portion of the surface situated oxygen will diffuse to the oxygen poor interior, and then must be reacquired to the surface prior to elimination to the vacuum, or inert gas medium.

The recognition that diffusion of sorbed oxygen from the interior of the lens mold could lead to disruption of lens quality even where surfaces had been swept of residual oxygen, thus lead to a further modification of processes for the handling of lens mold for and through the molding process. Specifically, every exposure of the lens mold to the atmosphere could be expected to lead to further sorption of oxygen which would diffuse in part to the interior of the part. In consequence, surface flushing as with nitrogen would not be sufficient to avoid molding problems derivative from the presence of oxygen, as in an oxygen starved inert atmosphere, the oxygen stored in the interior of the lens mold would readily and relatively rapidly desorb to the surface. Then, once the mold was filled with reactive monomer, no amount of flushing would resolve the problem.

It was then realized that for every atmospheric exposure, the lens mold would optimally be wholly degassed, hence only by minimizing the time of such exposures, and holding the lens mold under nitrogen for a time to permit essentially complete degassing could the problem be resolved satisfactorily. According to the invention, the injection molding operations previously performed off-site are physically integrated into the contact lens manufacturing line. With the high temperature and pressure of the mold equipment, the initially high oxygen levels on the pelletized feed are efficiently cleared and the fresh surfaces formed in the molding process are readily and preferentially purged of residual oxygen. The pelletized feed may also be degassed with nitrogen in the hopper of the injection mold.

Improvements in injection mold design and modifications in operational parameters, described in copending and commonly assigned application Ser. No. 08/287,785 for Mold Halves and Molding Assembly for Making Contact Lenses, now U.S. Pat. No. 5,486,058, have permitted advantageous reductions in cycle time. However, when the mold pieces are ejected from the mold, even in conjunction with the preferred automated system they may be subjected during transfer operations to atmospheric conditions, in which circumstances oxygen can diffuse into the mold, hence such exposure in demolding and transfer operations is limited to no more than about 15 seconds in each mold transfer, preferably no more than 12 seconds, whereafter the mold elements are blanketed in an inert gas environment, preferably nitrogen, provided in tunnel means incorporated about the material transfer line and about the filling and precure stations. The surface oxygen under these conditions diffuses into the nitrogen and into the depths of the mold element, away from the surface.

Based upon empirical studies involving polystyrene lens molds in automated operations under carefully controlled conditions it has been determined that a lag time for degassing under nitrogen of at least 3 minutes is required for each exposure of the lens mold of 15 seconds, for lens molds prepared under conditions described in application Ser. No. 08/258,264, now U.S. Pat. No. 5,656,208, although correlatively longer and shorter degassing times may apply for differing atmospheric exposures, or different system protocols.

After an exposure of from about 1 to about 5 minutes to nitrogen, usually within three minutes, the oxygen level at the surface is within tolerance limits, and usually is essentially zero within instrument capability.

The degassed concave lens mold sections are forwarded to a filling or dosing station maintained under nitrogen in which the reactive monomer is pooled in the concave mold sections. The concave and (degassed) convex lens mold sections are transferred to a mold registry and engagement operation maintained under vacuum, in which complementary concave and convex mold sections are associated in operative molding relation and aligned so that their axes of rotation are collinear and their respective flanges are parallel, by automated handling means. The concave and convex lens mold halves or sections in operative molding relation are then transferred to a precure station within the nitrogen tunnel.

Conveniently, degassing need not be effected after precure firstly because the system is closed, that is the reactive monomer is sealed between the paired concave and convex lens molds, and the curing time is sufficiently short such that diffusion of oxygen from the exterior of the lens mold does not occur to any degree to interfere with the molding process before it has been completed.

The continuous process implementing the features of this invention is effected utilize a lens mold manufacturing zone, comprising first and second injection molding stations for the formation of concave and convex lens molds, respectively, and includes a transport line upon which concave and convex lens parts may be conveyed from zone to zone; an enclosed zone ('nitrogen tunnel') maintained under nitrogen for degassing mold halves or sections, filling concave mold sections with reactive monomer composition, registering concave and convex mold sections in aligned relation, as aforesaid, and engaging same in mating molding relation under vacuum conditions, and precuring said reactive monomer composition with ultraviolet light to a gel-like state, said zone including a continuation of the said transport means for concave and convex mold sections, and a cure zone in which the cure is completed and the finished lens blank readied for demolding. It will be appreciated that the entire process is integrated via transport means, generally one or more conveyors upon or in relation to which lens molds are assembled, arranged or interleaved in the course of conveyance through the said zones or stations in operational sequence. The lens molds may for convenience be situated in or upon mini-pallets (for example, fabricated of cast aluminum, stainless steel or the like) containing a number of lens molds (for example eight) arranged regularly thereon in spatial relation correlated with the treatment stations and the automated material transfer equipment where employed. All of the conveyance belts or tunnels are under nitrogen or inert gaseous blankets.

Aspects and preferred features of the contact lens manufacturing system in part described and claimed herein are detailed in copending and commonly assigned application Ser. No. 08/258,267 for Apparatus for Removing and Transporting Articles from Molds, now abandoned; application Ser. No. 08/257,786 for Production Line Pallet System, now abandoned; Ser. No. 08/257,792 for Mold Clamping and Precure of a Polymerizable Hydrogel, pending; and application Ser. No. 08/257,785 for Mold Halves and Molding Assembly for Making Contact Lenses, now U.S. Pat. No. 5,540,410, the disclosures of all of which are incorporated herein by reference.

BRIEF DESCRIPTION OF THE DRAWINGS

The foregoing objects and advantages of the present invention for mold treatment and handling in a contact lens molding system may be more readily understood by one skilled in the art with reference to the following detailed description of the invention and its preferred embodiments, taken in conjunction with the accompanying figures [wherein like elements are designated by identical reference throughout the several views.]

DETAILED DESCRIPTION OF THE PREFERRED EMBODIMENTS

Figure 4A:
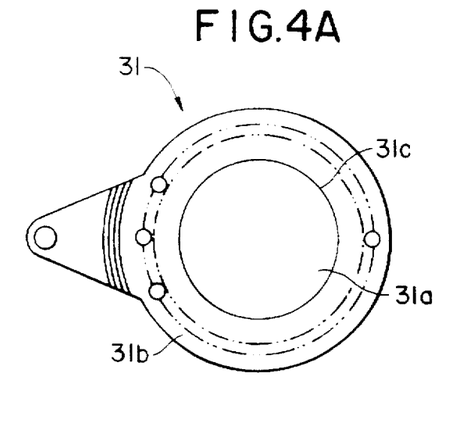
FIGS. 4(a) and 4(b) are top and side views, respectively, of front curve mold half that may be used in the practice of the present invention.
Figure 4B:
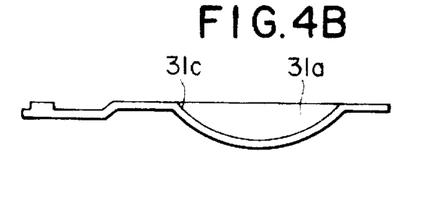
Figure 5A:
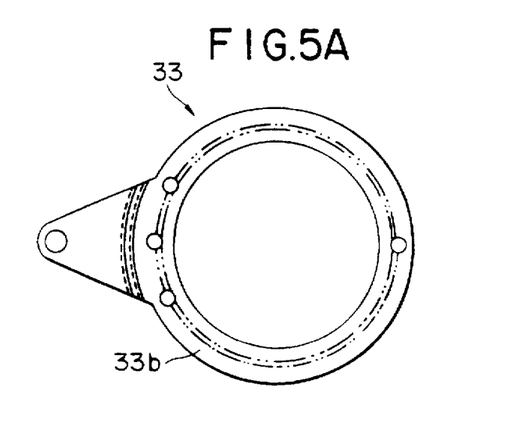
FIGS. 5(a) and 5(b) are top and side views, respectively, of back curve mold half that may be used in the practice of the present invention.
Figure 5B:
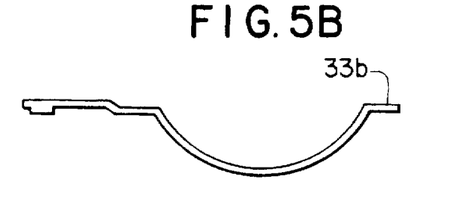

The present invention is useful in a process for forming soft contact lenses from a polymerizable hydrogel. The soft contact lenses are formed in a mold assembly having a first concave or front curve mold half 31 and a second convex or back curve mold half 33. As illustrated in FIGS. 4 or 5, the mold halves are formed of polystyrene transparent to visible and ultraviolet light, with a central curved section defining a concave surface 31(a) and a central curved section of the back curve of the front curve defining a convex surface 33(a). A circular circumferential edge 31(c) is defined on the base or front curve mold 31 and integral with the central curved sections are annular essentially uniplanar flanges 31(b) 33(b). At least a part of the concave surface 31(a) and the convex surface 33(a) have the dimensions of the front or back curves, respectively of a contact lens to be produced in the mold assembly, and sufficiently smooth that the surface of the contact lens formed by polymerization of said polymerizable composition in contact with the surface is optically acceptable. The mold is thin enough and has rigidity sufficient to transmit heat therethrough rapidly and to withstand prying forces applied to separate the mold halves during demolding.

The molds can be made from any thermoplastic material which is suitable for mass production and can be molded to an optical quality surface and with mechanical properties which will allow the mold to maintain its critical dimensions under the process conditions employed in the process discussed in detail below, and which will allow polymerization with the initiator and radiant energy source contemplated. The concave and convex mold members can thus be made from thermoplastic resins. Examples of suitable materials include polyolefins such as low, medium, and high density polyethylene, polypropylene, including copolymers thereof; poly-4-methylpentene; and polystyrene. Other suitable materials are polyacetal resins, polyacrylethers, polyarylether sulfones, nylon 6, nylon 66 and nylon 11. Thermoplastic polyesters and various fluorinated materials such as the fluorinated ethylene propylene copolymers and ethylene fluoroethylene copolymers may also be utilized.

It has been found that with the need for a high quality, stable mold and especially for the use of a plurality of molds in high volume operations the choice of material for the molds is significant. In the present invention the quality of production is not assured by individual inspecting and sorting each lens for power and curvature. Instead the quality is assured by keeping the dimensions of each individual mold member within very tight tolerances and processing molds in particular sequential steps to give all lenses equal treatment. Since polyethylene and polypropylene partly crystallize during cooling from the melt there is a relatively large shrinkage giving dimensional changes difficult to control. Thus, it further has been found that the most preferred material for the molds used in the present process is polystyrene which does not crystallize, has low shrinkage, and can be injection molded at relatively low temperature/to surfaces of optical quality. It will be understood that other thermoplastics, including those mentioned above, may be used provided they have these same properties. Certain copolymers or blend of polyolefins that exhibit these desirable characteristics are also suitable for the present purposes as are polystyrene copolymers and blends having such characteristics, as described more fully in U.S. Pat. No. 4,565,348.

For efficiency, ease of operation, and cycle times, injection molding devices are preferred. The preferred polystyrene is provided in the form of pellets or particles of relatively high surface area which have equilibrated fully with available oxygen available in the atmosphere. As the cycle time for purposes of an automated operation is minimized, average material throughput is as little as 6 seconds under the inventive conditions described in U.S. application Ser. No. 08/257,794, now U.S. Pat. No. 5,545,366 during which the material is heated to a thermoplastic condition, extruded into the molds and ejected or removed from the mold. However, the maximum manifold temperature of 270°–280° C. is achieved only for a fraction of the material throughput time, and the mold temperature is only 215°–220° C., hence it was surprising that the injection mold operation was found capable of delivering essentially fully degassed mold sections in each cycle.

The injection mold equipment is typically operated under conditions described in the aforesaid Ser. No. 08/257,794, now U.S. Pat. No. 5,545,366 including cycle times as short as 6 seconds or less. Unlike prior practice as described in U.S. Pat. No. 4,565,348, the mold is designed to produce fully formed lens mold parts directly, that is without associated support structure such as a frame; there is in consequence no need to dissociate the part from unneeded polymer material on demolding, and the lens mold parts may be directly collected by automated means for delivery to the transport means. In any given cycle, any number of mold parts may be prepared but for convenience of handling, typically 8 lens mold parts of concave or convex configuration are prepared in a given cycle and transferred by automated robotic means to a pallet of cast aluminum in which they are received and supported in a regular spatial array adapted for further operations.

It should be understood that at most stages of the continuous process, inspection means are operational to effect rejection of parts against reference criteria; hence, following injection molding, inspection, generally visual, employing photoelectric means, for example, for such defects as haze, mold defect as in configuration due to improper material feed and the like may lead to rejection of a part and thus disposal. To maintain the continuity and consistency in line operations generally a whole mold cycle or pallet of lens mold parts will be expelled from the line following discovery of a defect in any one lens mold part. Each of the pallets contain a unique bar code number for use in pallet tracking and quality control procedures utilizing bar code scanners.

The apparatus for removing and transporting lens mold parts from the mold to the transport means includes hand means for receiving the mold parts and a support subassembly capable of sliding and pivotable movement required for transfer of the mold parts to the horizontally operating transport means. This and related automated handling equipment is more fully described in copending and commonly assigned application Ser. No. 08/258,267 for Apparatus for Removing and Transporting Articles from Molds, now abandoned, the disclosure of which is incorporated herein by reference.

Figure 1:
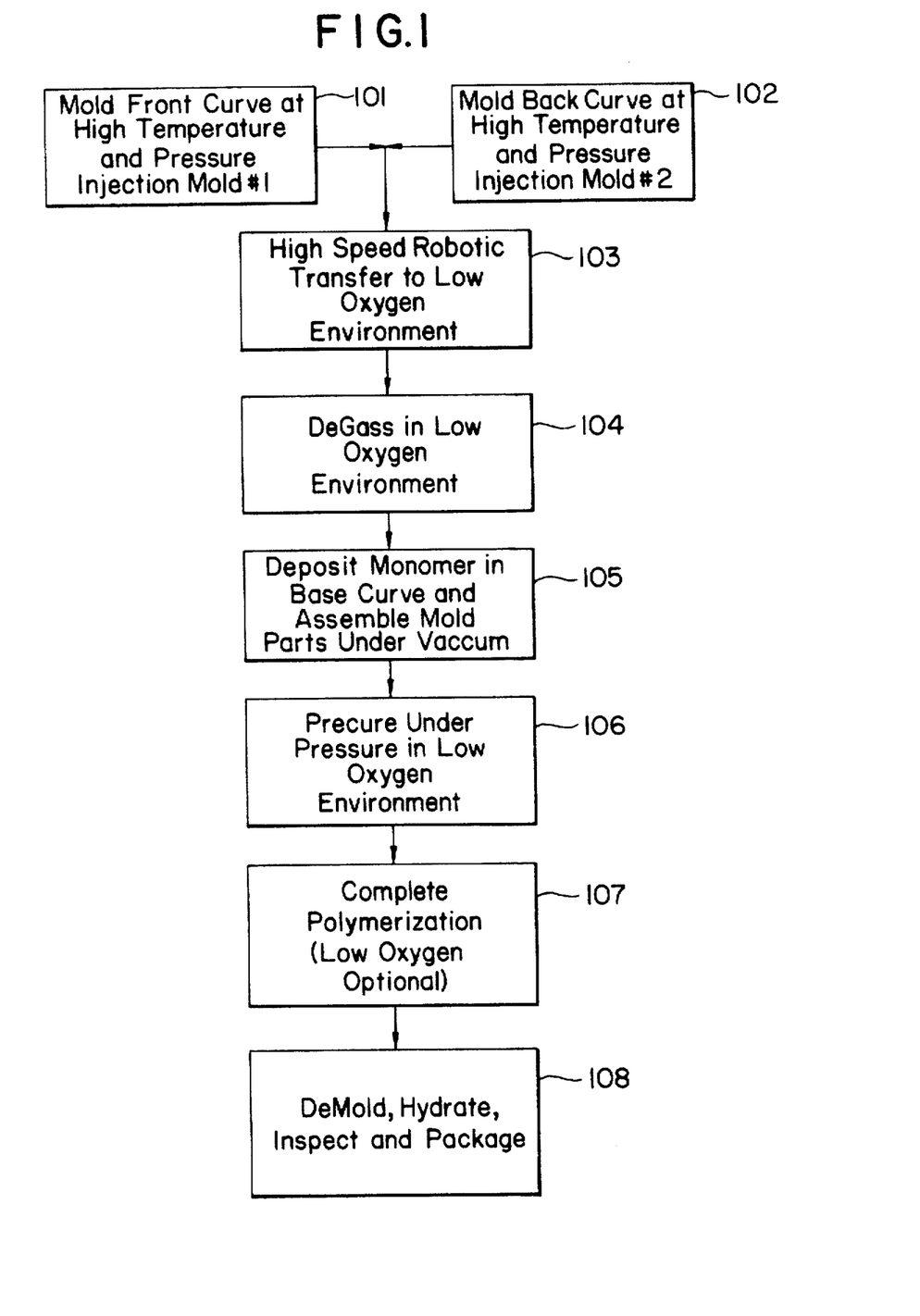
FIG. 1 is a flow diagram of the continuous process for lens mold production, treatment and handling of molds and contact lenses in a low oxygen environment.

Injection molds #1 and #2, as shown at 101 and 102 in flow diagram FIG. 1, respectively mold front curve and back curve lens mold parts or sections, in matched sets and volumes; they may be located in tandem as shown in FIG. 2 or to shorten exposure to the atmosphere still further, they may be located in a common plane intersecting a bifurcated transport line, even perpendicularly oriented thereto in the same plane. In any of these cases, having regard for the possible ejection of a pallet in the quality control procedure aforementioned, there is provided means adjacent the mold registry and engagement station for receiving and identifying pallets of concave and convex lens molds respectively and registering convex mold parts in vertically displaced relation with filled concave lens mold parts for formulation of a mold forming assembly for molding lens blanks.

In the course of or following complete degassing of the lens mold sections as indicated at 104 in FIG. 1, the pallets containing concave and convex lens mold sections are ordered into interleaved relation such that automated equipment may effect their operative interengagement into molding relation.

The filling or deposition zone including the precure station is enclosed and pressurized over its entire length with an inert gas, conveniently nitrogen. The amount of nitrogen is not critical, it being suitable to use just enough nitrogen pressure to effectively exclude the atmosphere under the operating conditions experienced. In respective sections of the filling or deposition zone included in the nitrogen tunnel the freshly prepared lens mold blanks are degassed, the concave lens molds are filled with the reactive monomer composition, and the concave and convex lens molds are placed into registry and urged into complementary molding relation. The filling zone surrounds a portion of the conveying or transport means, which delivers to the zone pallets of concave and convex lens mold sections, respectively, and at the terminus of the zone carries pallets of paired and filled molds to the precure zone. The filling zone illustrated in FIG. 2(b) at 40 is defined by a geometrically appropriate, transparent enclosure, generally of rectangular cross-section, formed of any suitable thermoplastic or metal and thermoplastic construction.

Figure 6:
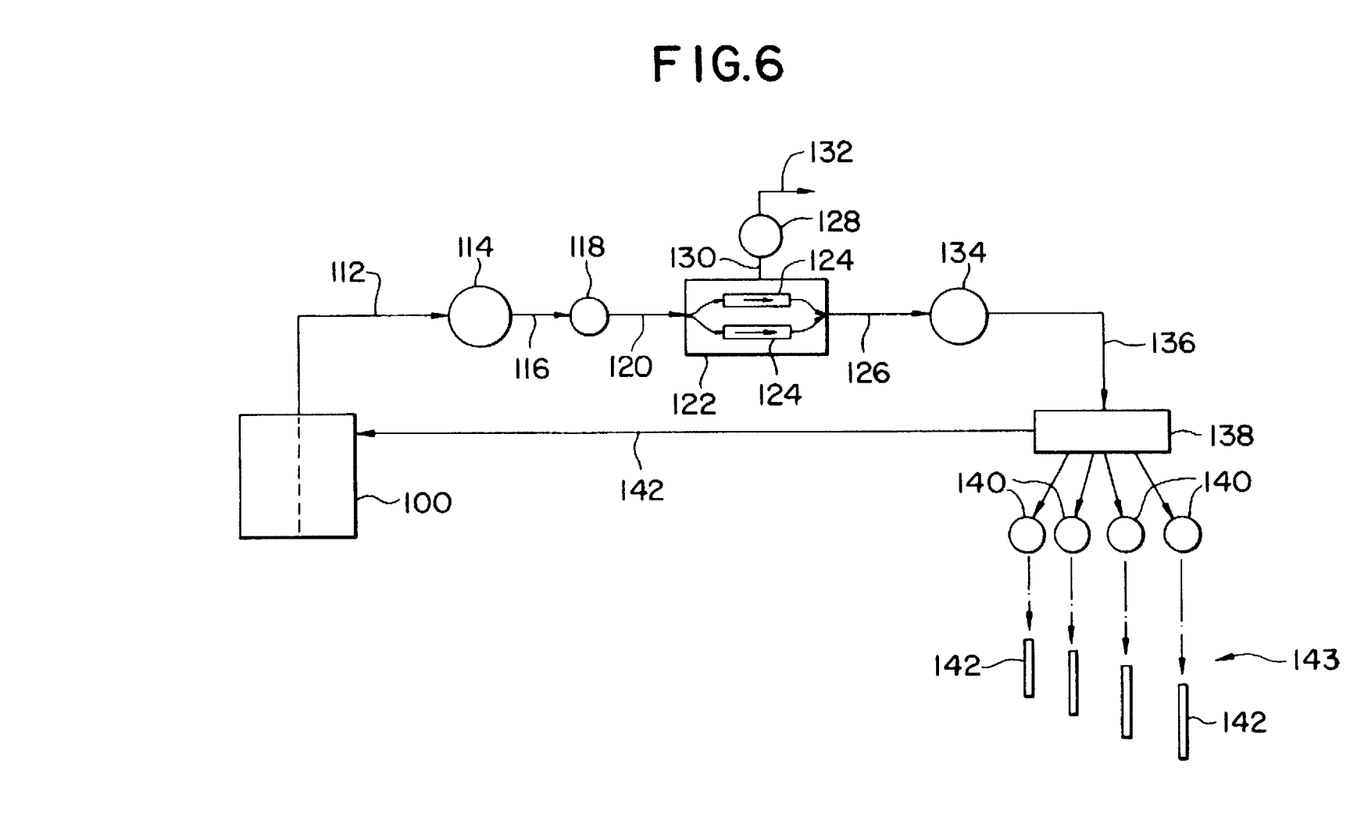
FIG. 6 is a diagrammatic illustration of an apparatus used to degas the monomer or monomer mixture used in molding the lenses.

As indicated at step 104 in FIG. 1, the monomer or monomer mixture is degassed prior to filling the mold cavity. The degas apparatus is schematically illustrated in FIG. 6, wherein the monomer or monomer mixture is provided in containers 100, typically 15 liters in volume. The container is connected to the monomer degassing system by means of line 112. Suction is developed by pump 114 to draw the monomer from the drum 100, through line 112, to pump 114, and out the pump discharge 116. While going through discharge line 116, the monomer passes through filter 118 in order to remove any extraneous particulate contaminants that may be present in the monomer.

The monomer is then provided to the inlet 120 of the degas unit 122. Within the degas unit, the monomer is divided among a plurality of tubes 124, and then recombined into a degas unit discharge 126. The degas unit is operated under a low ambient pressure, typically around 1–40 torr which is provided by vacuum pump 128. This vacuum pump is attached to the degas unit 122 by line 130 and discharges the excess air from the degas unit by way of line 132. The tubing members 124 are formed preferably of a gas permeable tubing such as STHT tubing produced by Sanitec, Inc.

of Andover, N.J. from Q74780 Medical Grade Silicon Rubber manufactured by Dow Corning of Midland, Mich. While two tubes are illustrated in FIG. 6, it is understood that a plurality of tubes, typically 10 tubes are provided for the degas unit 122.

After the monomer exit the degas unit 122 by discharge line 126, it passes through an oxygen monitor 134. This monitor measures the residual oxygen within the monomer to insure that the degas unit is functioning properly. If the oxygen content of the monomer is indicated as being to high, operation of the production line can be halted until the problem is corrected in order to avoid the production of defective lenses.

Once oxygen monitor 134 has determined that the oxygen content of the monomer is sufficiently low, the monomer passes through line 136 into manifold 138. The manifold is used as a common source to supply a plurality of precision dose pumps 140 regulated by pump controllers 141 and used to fill the individual contact lens mold at the monomer dosing station 50. The pumps 140 used to pump the processed monomer delivered to manifold 138 are IVEK pumps made by the IVEK Corporation of North Springfield, Vt. These pumps provide precision doses of degassed monomer to the mold cavities 31 via nozzles 142.

As was hereinafter previously described with respect to FIG. 1(a). The monomer is supplied from pumps 140 to nozzles 142 via gas in previous supply lines 141 which may include coupling blocks 143 to aide in servicing the equipment. Each of the supply lines 141 is coupled to an associated discharge nozzle 142, which are suspended directly over the path of the pallet 20 and the individual front curves 31 at the filling zone 40. It should also be noted that the ambient atmosphere surrounding pallet 20 at the time of filling is a low oxygen $N^2$ environment. Pumps 140 are actuated to deliver a controlled dose of 60 μl to each of the mold cavities 31.

Each of the nozzles 142 includes a teflon dosing tip with an O.D. of approximately 0.070" and an I.D. of approximately 0.040. Each tip is cut at approximately a 45° angle, and is positioned to be within 0.5 mm of the horizontal tangent of the front curve 31 at the time of filling.

As the monomer or monomer mixture is pumped, it pools upwardly around the tip, so that the angle of the tip is covered. The nozzle 142 is reciprocated upwardly after filling the mold cavity and the pool of monomer wicks the nozzle tip, and draws any excess monomer form the face of the tip to avoid drop formation on the tip. This wicking action increases the accuracy of the dose, it pulls off potential drops of monomer and it avoids any agitation of the monomer that might result in bubble formation.

If drops of monomer form on the tip, there is the possibility of contamination of a passing pallet or the filling station from an inadvertent drop. Individual drops of monomer, even when deposited into a mold cavity, or on top of the monomer pool, have been found to generate a "seed" site for a gas bubble. By wicking the tip with the monomer pool, this possibility is substantially eliminated.

As illustrated at 105 in FIG. 1, the concave lens mold sections are filled with the reactive monomer composition, and then transported into and through a vacuum chamber formed intermittently and integrally of the nitrogen tunnel in which filled concave lens molds are engaged with convex mold sections in vertical alignment and in mating relation, such that the reactive monomer composition is trapped between the optical surfaces of the respective mold sections and at least partially sealed by the engagement of the sealing ring formed peripherally in each of the lens mold sections. The vacuum is released and the mated mold is passed through nitrogen to the precure station, an integral part of the nitrogen tunnel.

Conveniently, the vacuum chamber is formed upon and about a single pallet by the periodic reciprocable motion of apparatus also comprising means for alignment of the seating of the convex mold sections upon the concave mold sections so their axes of rotation are collinear and their respective flanges are parallel. Upon sealing engagement with the pallet the thus formed chamber is evacuated in order to ensure that no gas bubbles are entrapped between and upon the respective optical molding surfaces. The degree of vacuum is selected for the purpose of removing any gas bubbles at the reactive monomer/mold interface entrapped in the course of closure between the complementary mold sections.

Precure is effected all as described in copending and commonly assigned application Ser. No. 08/257,792 for Mold Clamping and Precure of a Polymerizable Hydrogel, pending, incorporated herein by reference.

The critical feature of the present invention resides in the mold handling and treatment steps, in which exposure of the freshly molded lens mold parts to the atmosphere is limited, and a degassing step is correlated with such atmospheric exposure as is necessarily incurred despite automated continuous operations. Thus, when coupled with vacuum registry and engagement of mold halves or sections, and a precure under nitrogen conditions the invention permits the generation of high optical quality soft contact lenses in volume and at high speed, with a low defect count with superior optical qualities.

Figure 2A:
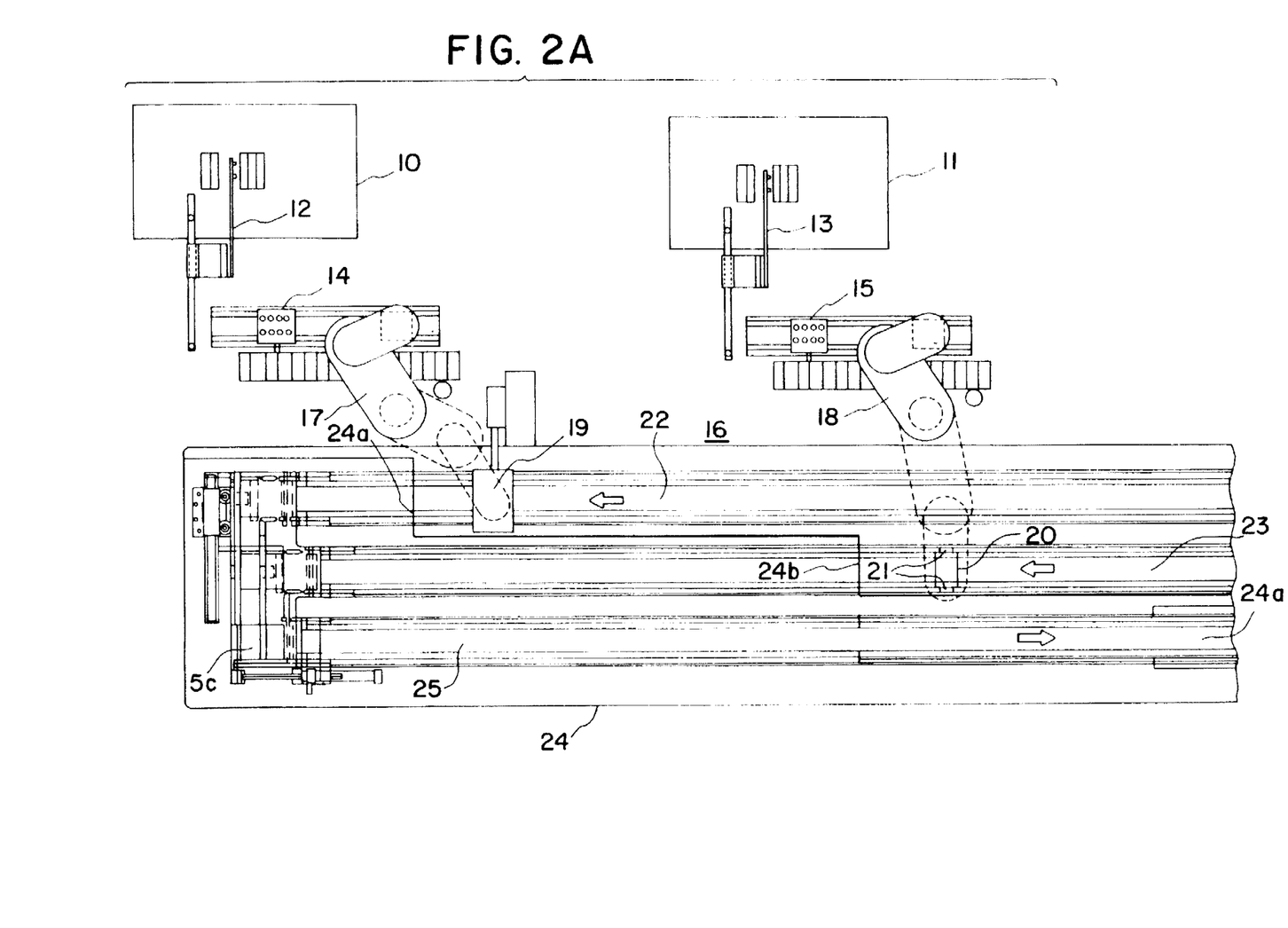
FIG. 2(a) is a simplified plan view of the first section of an automated line for the molding of hydrogel contact lenses, and includes diagrammatic plan views of the injection apparatus and robotic material handling devices used to prepare mold halves for the lenses to be molded.

In accordance with the present invention and as illustrated in FIGS. 2(a)–(d), first and second injection molds 10, 11 are continuously cycled to periodically produce (generally, from 3 to 12 seconds, and preferably around 6 seconds) sets of concave and convex lens mold parts or sections which are collected from molds at the end of each cycle. In the geometric configuration obtaining, (and preferred for better manipulative exchange) the mold upon opening for demolding present the finished lens mold parts in or close to the vertical plane, generally −5° to 10° from the vertical. As illustrated in FIG. 2(a) and noted at 103 in FIG. 1, the respective fingers of the articulated hand means 12, 13 gently engage and receive the set of molds and while maintaining same in essentially the same spatial relation, rotates from a plane generally perpendicular to the transport line through 90° to a parallel plane above the transport means while simultaneously or sequentially rotating toward and engaging the horizontal plane of the transport line, and releases the mold parts into registry with carrier pallets 14, 15 therefor with related spatial geometry located adjacent the production line transport or conveyor means indicated generally at 16 in FIG. 2(a). Obviously separate means feed carrier pallets 14, 15 are in timed sequence with the action of the collecting arms 12, 13.

The front curve mold parts or halves are removed form the injection mold 10 in an inverted orientation to avoid any possible contact with the optical surface 31(a) of the mold half. The front curve halves are then inverted by robotic transfer hand 19 and deposited on a stationary pallet therebelow.

The articulated robotic transfer arm 18 deposits the back curve mold parts directly on a production line pallet 20 that has been momentarily paused by a clamping means 21.

After receiving the sets of mold parts, the pallets are advanced by the belt conveyors 22, 23, in the direction indicated by the arrows in FIG. 2(a) into a low oxygen environment, generally indicated by housing means 24. Housing means 24 is pressurized with $N_2$ as indicated, and may optionally be equipped with the nitrogen ventilation lock illustrated in FIG. 3 at each entry and egress point of the low oxygen environment, including entry points 24(a) and 24(b).

Figure 3:
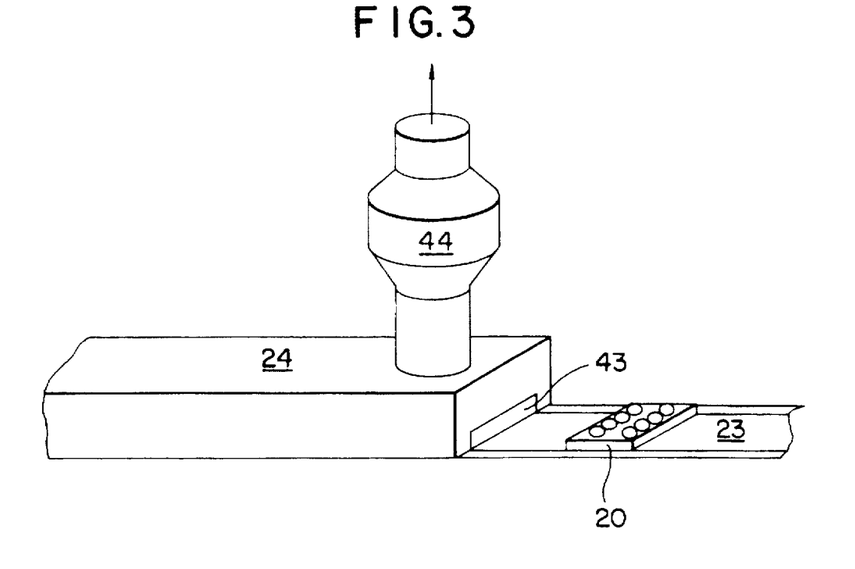
FIG. 3 is a diagrammatic view of an apparatus that may be used as a degas ventilation system in the practice of the present invention.

FIG. 3 is a diagrammatic representation of a nitrogen ventilation system that could be utilized advantageously at 24(a), 24(b) and 24(c), respectively. As illustrated in FIG. 3, the $N_2$ tunnel enclosure 24 surrounds a conveyor such as conveyor belt 23 in FIG. 2(a). The conveyor belt 23 transports a pallet 20 filled with mold parts into the $N_2$ tunnel through opening 43. Opening 43 may be open to atmosphere with the tunnel pressurized, or it may be closed with a movable door (not shown) that is opened each time a pallet is loaded with mold parts. An exhaust vent 44 may also be provided to provide a controlled exhaust for the pressurized $N_2$ and to exhaust any $O_2$ which enters with ambient atmosphere. If the $N_2$ exhaust is used, it may also be equipped with a check valve to maintain 0.1 inches of $N_2$ pressure within tunnel 24.

While the nitrogen ventilation lock has been described and illustrated with respect to entry lock 24(b), it is understood that it could also be installed at entry port 24(a) and egress port 24(c). The purpose of the nitrogen lock is to avoid excess $N_2$ dissipation from the $N_2$ tunnel enclosure 24.

Usually, the carrier pallets containing concave and convex mold parts respectively, are then interspersed or interleaved alternately upon the transport means at station 50, prior to entry on the required production line conveyor 25, but are independently identifiable to the control means for handling same at the molding forming station so to compensate for any missing pallet.

A two step robotic handling is used in the preferred embodiment in order to keep up with the 6 sec mold cycle time. The first robotic transfer by arms 12, 13 to intermediate carriers 14, 15 is accomplished in approximately 3 seconds, and during the remaining interval, the intermediate covers 14, 15 move to a pickup point for the articulated robotic transfers arms 17, 18. The articulated robotic arms 17, 18 then transfer the sets of mold parts to mold carriers particularly adapted for use with the production line of the present invention, as will be hereinafter explained in detail.

As aforementioned, the lens mold parts or segments are transferred to the nitrogen tunnel 24 within 12–15 seconds, and degassed for a period of time sufficiently to remove substantially all of the sorbed oxygen in and on the part. Generally, tolerances are such that a 3 minute exposure is sufficient, provided by a zone of suitable length within enclosure 24 at constant speed or coverings 22, 23 and 25, or by a tortuous passageway in a shorter zone.

Figure 2B:
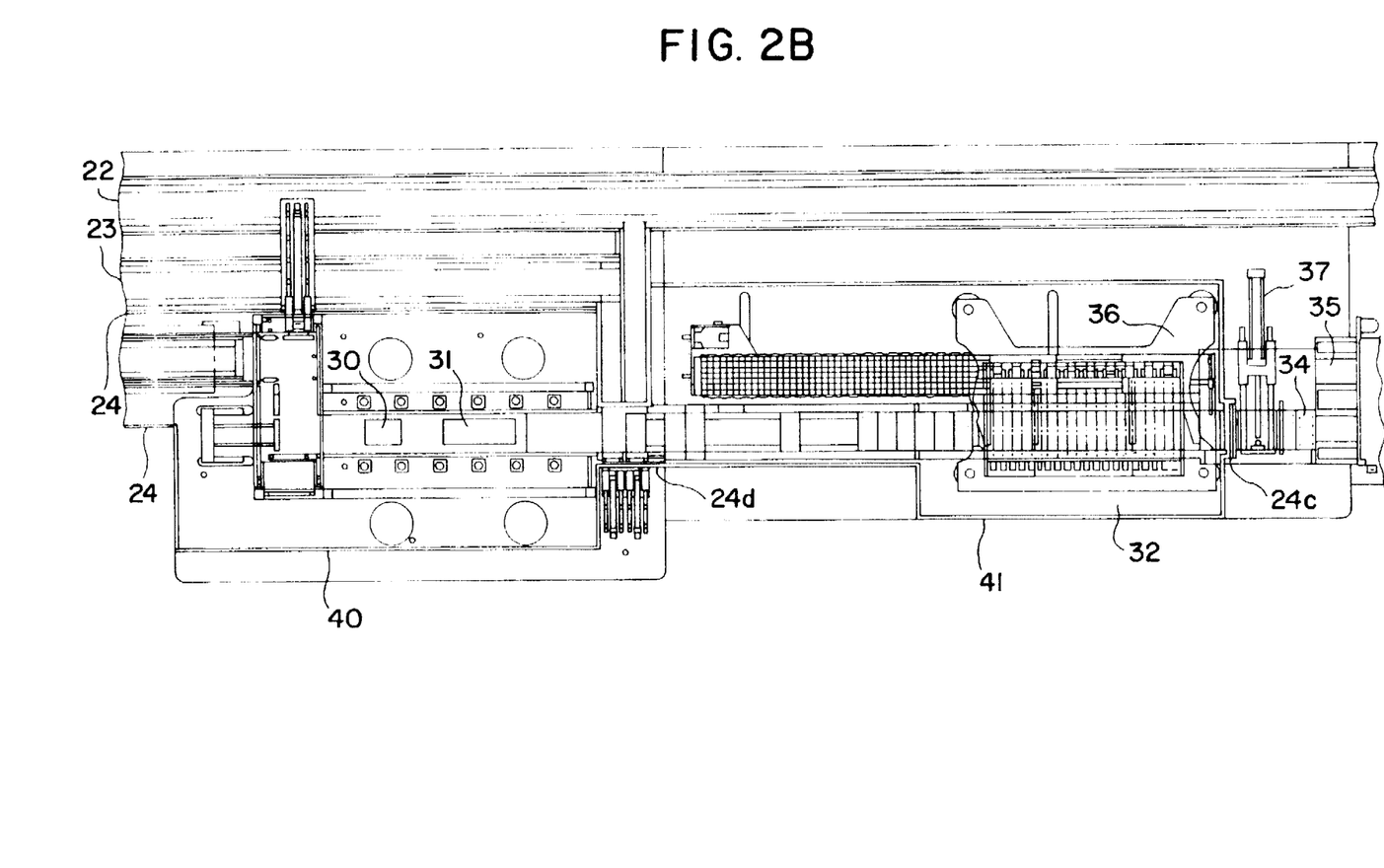
FIG. 2(b) is a simplified plan view of a second section of the automated line for molding hydrogel contact lenses, which illustrates the filling and assembly stations and a precure station utilized in the practice of the present invention.

Following satisfactory degassing of the lens mold blanks, and within the nitrogen tunnel 24, the lens molds are conveyed to filling station 30 within the filling zone 40 illustrated in FIG. 2(b). Within the filling station 30, each of the front curves 31 is filled with the reactive monomer composition, that is the monomer composition is pooled via metering flow of about 60 µl of reactive monomer composition into each lens mold part to essentially over fill the mold cavity which results from combining mold parts 31 and 33. The reactive monomer composition is itself carefully degassed as previously described to minimize the presence of oxygen.

Each such concave mold is then assembled with its complementary convex mold partner in a vacuum station 31 by automated means which inverts sets of back curve mold halves in vertically displaced registry with the filled concave lens mold parts, releasing the convex back curve mold parts into and upon the surface of the filled concave front curve lens mold. As noted at 106 in FIG. 1, the paired molds now in molding relation are intermittently transported integrally from the treatment and filling and assembly zone 40 through nitrogen, to a precure station 32 in which the mold halves are clamped together under predetermined pressure for a predetermined period of time. The clamping step aligns the mold halves, removes excess monomer from the mold cavity, and seats a compliant second mold half against a more rigid first mold half for the precure step. The clamping pressure aligns flanges formed on the first and second mold halves to ensure that the flanges are parallel and that the respective curves of the molds are aligned. The clamping pressure also seats the sealed mold halve against an annular edge formed on the first mold half to essentially sever any excess monomer from the molded lens.

The clamping pressure may be applied by an annular air cylinder or spring driven annular cylinder which allows actinic radiation to pass through the annulus of the cylinder and through one or more of the mold halves and into the hydrogel. The means may include a means for controlling the duration and intensity of the clamping pressure, and the duration and intensity of the actinic radiation.

After a predetermined clamping period, the hydrogel is exposed to actinic radiation, such as a UV light source, to partially cure the monomer or monomer mixture to a gel state.

The precure station 32 is also enclosed within a low oxygen zone, maintained by a separate hood 41, and connected to the filling zone 40 by a short transition tunnel 24(d).

In the preferred embodiment the radiation source may be actinic, electron beam or radioactive source, but preferably is an ultraviolet lamp which irradiate the monomer at 2–4 mW/cp$^2$ for 5–60 seconds, but preferably 30 seconds. Radiation may also be from a high intensity UV source that is pulsed or cycled.

Figure 2C:
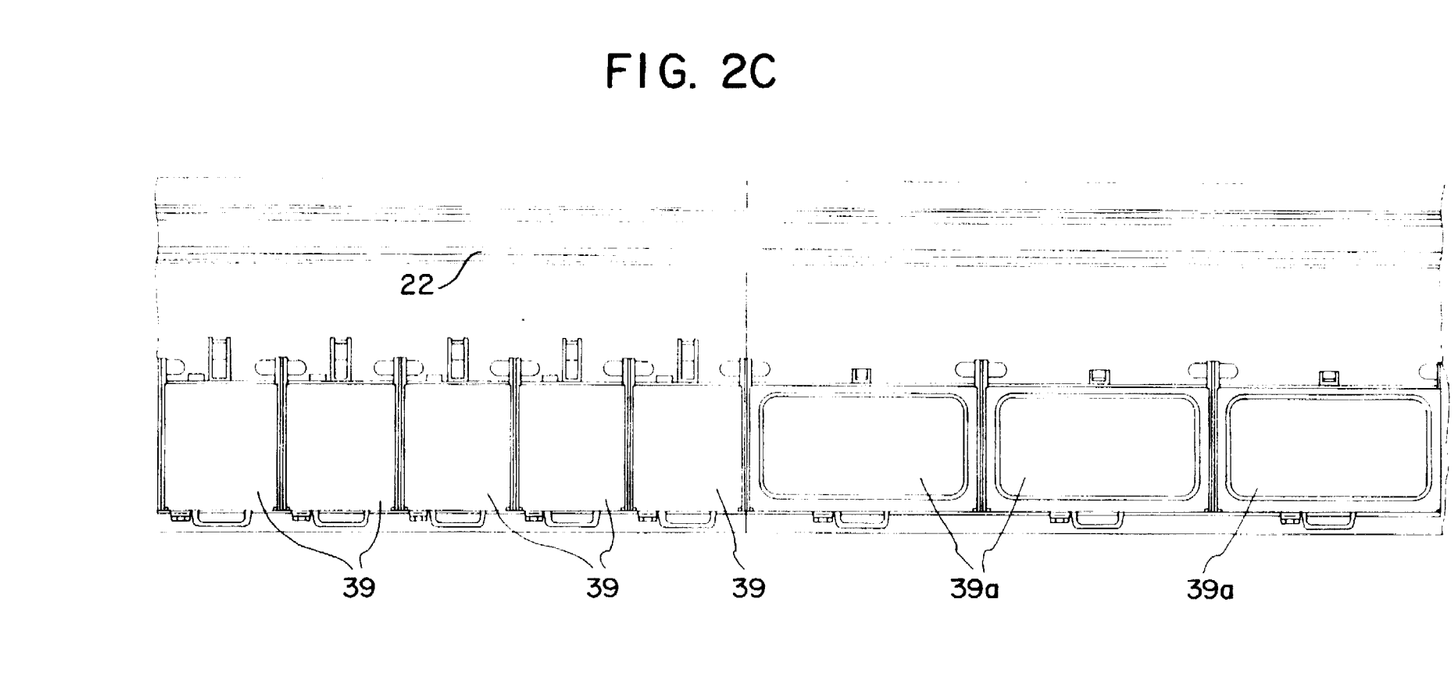
FIG. 2(c) is a simplified plan view of a third section of the automated line for molding hydrogel contact lenses, which illustrates the curing ovens for the lenses.

After a second predetermined period of exposure under clamping pressure, the clamping action and the UV radiation are removed, and the partially precured hydrogel lens is then transported in the mold to the extended curing tunnel illustrated in FIG. 2(c) for complete polymerization and cure.

The pallets containing the precured lens blanks sandwiched between the lens mold blanks are passed through a nitrogen lock 24(c) at the end of the nitrogen tunnel 24 to a cure zone. The monomer/diluent mixture is then cured in a UV oven whereby polymerization is completed in the monomer(s). This irradiation with actinic visible or ultraviolet radiation produces a polymer/solvent mixture in the shape of the final desired hydrogel lens. As noted at 107 in FIG. 1, the final cure may be under $N_2$ or under ambient atmosphere, since a complete cure is effected before $O_2$ in the atmosphere can migrate through either of the mold halves.

FIGS. 2(b) and 2(c) illustrate the cure zone of the production line in which the present invention is practiced. To maintain sufficient residence time, of up to 24 minutes in the cure zone, while maintaining a high cycle time at the front end of the line, the single conveyor line 24(a) is doubled to a pair of lines 34, 35 by means of the precure transfer arm 36 and a shuttle ram 37 which transfers half of the output from precure station 32 from conveyor 34 to conveyor 35.

The two separate lines are then recombined at station 38, immediately after the demolding step at station 33.

The cure is completed by a plurality of IR ovens 39 and 39(a) which provide UV radiation at an average intensity of 3 to 3.5 mW/cm² and a controlled temperature of 45° C. to 65° C., which may be varied from oven to oven.

Figure 2D:
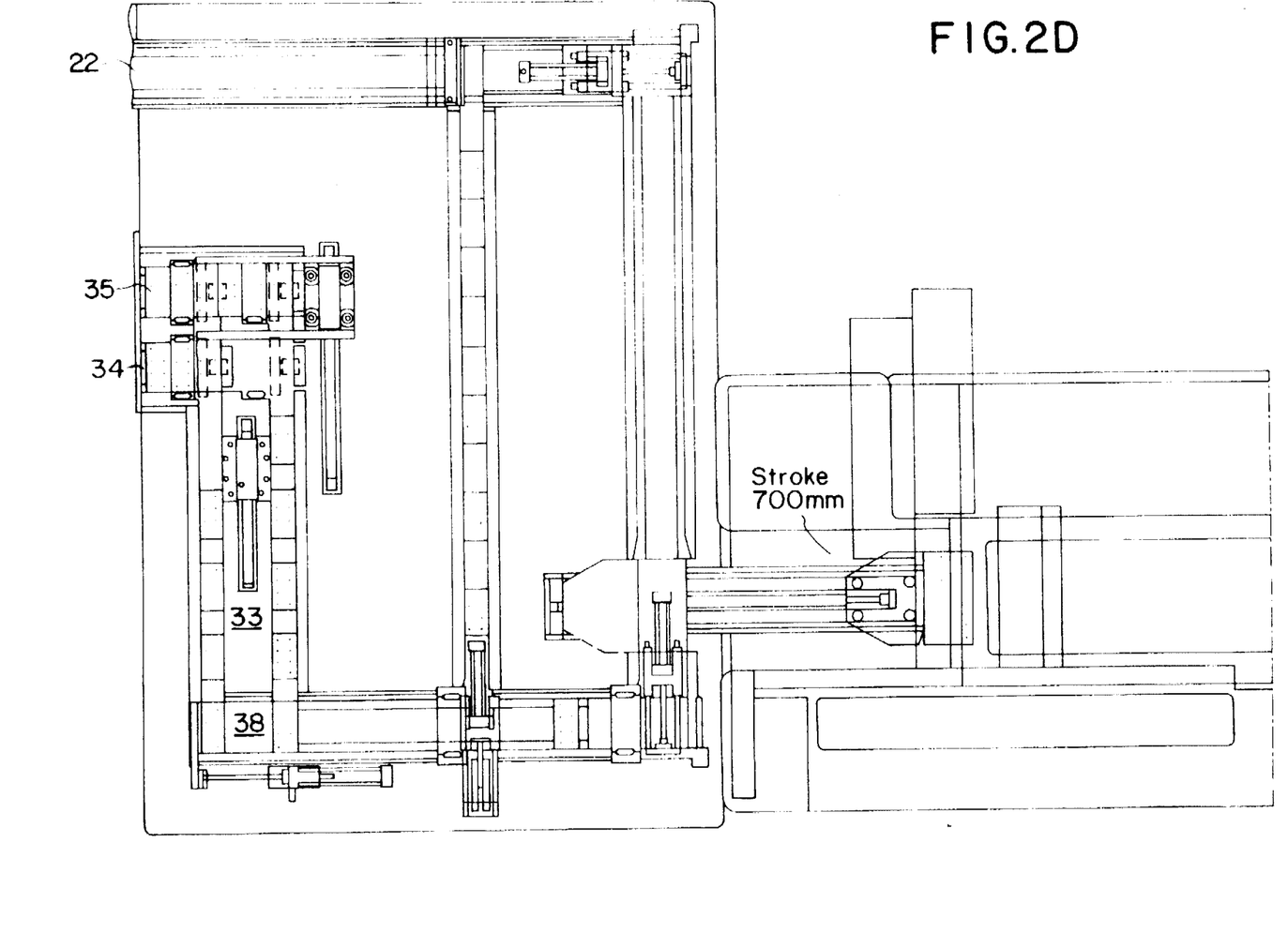
FIG. 2(d) is a simplified plan view of a fourth section of the automated line for molding hydrogel contact lenses, which illustrates the demolding station for the lenses.

After the polymerization process is completed, the two halves of the mold are separated in a demolding step by the demolding apparatus 33 in FIG. 1(d) leaving the contact lens in the first or front curve mold half, from which it is subsequently removed. Preferably, the flanges of the front and base mold halves are gripped and pulled away from each other, either in directly opposite directions or through an angle in a prying sort of motion. Advantageously, the assembly is first heated moderately to facilitate separation of the polymerized article from the mold half surface. The front and base curve mold halves are used for a single molding and then discarded or disposed of. After the demolding step, the solvent is displaced with water to produce a hydrated lens, which when fully hydrated and buffered, will be of the final shape and size and then packaged, as noted at 108 in FIG. 1. The final size, in most cases, is nominally 10% larger than the original molded polymer/solvent article.

The soft contact lens blanks are formed from a reactive monomer composition which typically incorporates in addition to the reactive monomer a water displaceable diluent in the case of the preparation of a hydropic lens, a polymerization catalyst to assist in curing the reactive monomer a cross-linking agent and often a surfactant to aid in mold release.

The curable compositions preferably include copolymers based on 2-hydroxyethyl methacrylate ("HEMA") and one or more comonomers such as 2-hydroxyethyl acrylate, methyl acrylate, methyl methacrylate, vinyl pyrrolidone, N-vinyl acrylamide, hydroxypropyl methacrylate, isobutyl methacrylate, styrene, ethoxyethyl methacrylate, methoxy triethyleneglycol methacrylate, glycidyl methacrylate, diacetone acrylamide, vinyl acetate, acrylamide, hydroxytrimethylene acrylate, methoxyethyl methacrylate, acrylic acid, methacryl acid, glyceryl methacrylate, and dimethylamino ethyl acrylate.

Preferred polymerizable compositions are disclosed in U.S. Pat. No. 4,495,313 to Larsen, U.S. Pat. No. 5,039,459 to Larsen et al. and U.S. Pat. No. 4,680,336 to Larsen et al., the disclosures of which are hereby incorporated herein by reference. Such compositions comprise anhydrous mixtures of a polymerizable hydrophilic hydroxy ester of acrylic acid or displaceable ester of boric acid and a polyhydroxyl compound having preferably at least 3 hydroxyl groups. Polymerization of such compositions, followed by displacement of the boric acid ester with water, yields a hydrophilic contact lens. The mold assembly utilized in the present invention may be employed to make hydrophobic or rigid contact lenses, but the manufacture of hydrophilic lenses is preferred.

The polymerizable compositions preferably contain a small amount of a cross-linking agent, usually from 0.05 to 2% and most frequently from 0.05 to 1.0%, of a diester or triester. Examples of representative cross linking agents include: ethylene glycol diacrylate, ethylene glycol dimethacrylate, 1,2-butylene dimethacrylate, 1,3-butylene dimethacrylate, 1,4-butylene dimethacrylate, propylene glycol diacrylate, propylene glycol dimethacrylate, diethylglycol dimethacrylate, glycol dimethacrylate, diethylglycol dimethacrylate, dipropylene glycol dimethacrylate, diethylene glycol diacrylate, dipropylene glycol diacrylate, glycerine trimethacrylate, trimethylol propane triacrylate, trimethylol propane trimethacrylate, and the like. Typical crosslinking agents usually, but not necessarily have at least two ethylenically unsaturated double bonds.

The polymerizable compositions generally also include a catalyst, usually from about 0.05 to 1% of a free radical catalyst. Typical examples of such catalysts include lauroyl peroxide, benzoyl peroxide, isopropyl percarbonate, azobisisobutyronitrile and known redox system such as the ammonium persulfate-sodium metabisulfite combination and the like. Irradiation by ultraviolet light, electron beam or a radioactive source may also be employed to catalyze the polymerization reaction, optionally with the addition of a polymerization initiator. Representative initiators include camphorquinone, ethyl-4-(N,N-dimethylamino)benzoate, and 4-(2-hydroxyethoxy)phenyl-2-hydroxyl-2-propyl ketone.

Polymerization of the polymerizable composition in the mold assembly is preferably carried out by exposing the composition to polymerization initiating conditions. The preferred technique is to include in the composition initiators which work upon expose to ultraviolet radiation; and exposing the composition to ultraviolet radiation of an intensity and duration effective to initiate polymerization and to allow it to proceed. For this reason, the mold halves are preferably transparent to ultraviolet radiation. After the precure step, the monomer is again exposed to ultraviolet radiation to a cure step in which the polymerization is permitted to proceed to completion. The required duration of the remainder of the reaction can readily be ascertained experimentally for any polymerizable composition.

What is claimed is:

1. A process for molding contact lenses, comprising:
    a. providing lens mold material that has been exposed to atmospheric oxygen;
    b. injection molding, at an elevated temperature sufficient to remove substantially all of the oxygen, a lens mold from the lens mold material;
    c. transferring the lens molds to an inert gas atmosphere;
    d. holding the lens molds in the inert gas atmosphere for a period of time; and
    e. filling the lens molds with a polymerizable monomer under the inert gas atmosphere.

2. The process of claim 1, wherein the transfer of the lens mold to the inert gas atmosphere is accomplished within about 30 seconds of completion of the injection molding step.

3. The process of claim 1, wherein the period of time in the holding step is from about 0 to about 15 minutes.

4. The process of claim 1, wherein the period of time in the holding step is from about 3 to about 5 minutes.

5. The process of claim 1, wherein in the filling step the lens molds are filled with an acrylate reactive monomer composition and at the time of filling there is an oxygen concentration at the lens mold/reactive monomer interface of not greater than $1 \times 10^{-8}$ moles/cm³.

6. The process of claim 1 wherein the lens mold material is polystyrene.

7. A process for manufacturing lens molds for immediate use in a contact lens manufacturing system comprising:
    a. providing lens mold material that has been exposed to atmospheric oxygen;
    b. injection molding the lens molds from the lens mold material in the presence of atmospheric oxygen at a mold temperature such that substantially all of the oxygen is removed said mold temperature applied over a cycle of three to twelve seconds;

c. transferring the lens molds to an inert gas atmosphere;

d. holding the lens molds in the inert gas atmosphere for a period of time; and e. filling the lens molds with a polymerizable monomer under the inert gas atmosphere prior to mold assembly.

8. The process of claim 7 wherein the transfer step is accomplished within about 12 to 15 seconds of completion of the injection molding step.

9. The process of claim 7 wherein the lens mold material is polystyrene.

10. The process of claim 7 wherein the holding step is at least about 3 minutes.

11. The process of claim 7, wherein said mold temperature is at least about 450° F.

* * * * *